United States Patent [19]

Thomson et al.

[11] Patent Number: 4,541,965

[45] Date of Patent: Sep. 17, 1985

[54] DISPERSANTS FOR AQUEOUS SLURRIES

[75] Inventors: Timothy Thomson; Ronald L. Glomski, both of Baton Rouge, La.

[73] Assignee: The Dow Chemical Company, Midland, Mich.

[21] Appl. No.: 642,988

[22] Filed: Aug. 22, 1984

Related U.S. Application Data

[63] Continuation-in-part of Ser. No. 573,738, Jan. 25, 1984, abandoned.

[51] Int. Cl.$^4$ ............................................. C07C 143/24
[52] U.S. Cl. .............................. 260/505 C; 106/308 S; 260/505 N
[58] Field of Search ................ 106/308 S; 260/505 C, 260/505 N

[56] References Cited

U.S. PATENT DOCUMENTS 3,970,690 7/1976 Suzuki et al. .................... 260/505 C Primary Examiner—Lorenzo B. Hayes
Attorney, Agent, or Firm—Dan R. Howard

[57] ABSTRACT

The present invention provides a water-soluble dispersant for aqueous slurries of coal, lignite, cement, gypsum, and fillers. The dispersant comprises a sulfonated mixture of polynuclear fused-ring aromatic hydrocarbon compounds. The mixture, prior to sulfonation, (a) is liquid at a temperature of 100° Centigrade, (b) has an aromatic content of more than about sixty percent, (c) a molecular weight distribution of from about 150 to about 10,000, and (d) a weight average molecular weight of less than about five hundred.

9 Claims, No Drawings

DISPERSANTS FOR AQUEOUS SLURRIES

CROSS REFERENCE TO RELATED APPLICATIONS

This is a continuation-in-part application of Ser. No. 573,738 filed Jan. 25, 1984, now abandoned.

BACKGROUND OF THE INVENTION

This invention relates to dispersing agents for aqueous slurries. More particularly, this invention provides improved water-soluble dispersants that substantially increase the concentration of and/or reduce the viscosity of aqueous slurries of solid particulates such as coal, lignite, cement, gypsum, fillers (calcium carbonate), and other similar materials.

Water serves as an effective vehicle for preparing slurries of many particulate solids. A low solids content and/or a high viscosity often reduces the effective use of such slurries. Increasing the solids concentration of such slurries is seldom practical because of disproportionate increases in viscosity. Reducing the viscosity of such slurries via use of known dispersants has not always been technically or economically successful. For example, sulfonated alkyl-aromatic hydrocarbons, and condensation polymers of sulfonated naphthalene and formaldehyde have been effectively used as dispersants for aqueous coal and cement slurries, but use of such dispersants in these applications has been limited because of their relatively high cost.

SUMMARY OF THE INVENTION

In general, the present invention provides a relatively low cost, new and improved water-soluble dispersant comprising a mixture of sulfonated polynuclear fused-ring aromatic hydrocarbon compounds. The polynuclear fused-ring aromatic compounds, prior to sulfonation, are liquid at a temperature of about 100° Centigrade or less and have a weight average molecular weight of less than 500 and an aromatic content of greater than about 60 percent. This dispersant is particularly useful for dispersing finely-divided particulate solids, such as coal, lignite, cement, calcium sulfate (gypsum), calcium carbonate (filler), and other similar materials, in water to form slurries having a relatively low viscosity and a relatively high solids content.

The present invention also provides a multistep method for making this water-soluble dispersant. In a first step, a mixture of polynuclear fused-ring aromatic hydrocarbon compounds having an aromatic content of greater than about sixty percent is dissolved in a first non-reactive solvent to form a first solution. In a second step, sulfur trioxide is dissolved in a second non-reactive solvent to form a second solution. In step three, the first and second solutions are admixed. The aromatic hydrocarbon compounds react with the sulfur trioxide upon mixing to form a mixture of solid sulfonated aromatic hydrocarbon compounds which are insoluble in both the first and second solvents. In step four, the mixture of solid sulfonated aromatic hydrocarbon compounds is separated from the solvents. After separation of the solids, the solvents can be further separated and recycled to first and second steps. Beneficially the first and second solvents are the same solvent providing it will dissolve a satisfactory amount of both reactants. In this case, a solvent separation step before recycle is not necessary.

To more clearly define the present invention and to avoid any ambiguity in this specification, the terms and phrases listed below have the following meaning as used herein:

"Aromatic content" means the ratio of the number of aromatic carbon atoms to the total carbon atoms in the molecular structures of the dispersant compounds multiplied by one-hundred.

"Dispersing agent" means a surface-active agent added to a suspending medium to promote uniform and maximum separation of extremely fine solid particles.

"Surface-active agent (Surfactant)" means any compound that reduces surface tension when dissolved in water or water solutions, or which reduces interfacial tension between a liquid and a solid.

"Polynuclear" means aromatic compounds having a molecular structure which contains three or more closed homocyclic carbon rings, wherein the rings are usually, but not necessarily, of the benzenoid type.

"Fused-ring" means a closed homocyclic carbon ring of an aromatic compound having a structure wherein two or more of its sides provide common sides for other closed homocyclic carbon rings of the aromatic compound.

"Gas oil" means a liquid petroleum distillate with a viscosity and boiling range between kerosene and lubricating oil.

"Naphtha" means refined, partly refined, or unrefined petroleum products, and liquid products derived from natural gas not less than ten percent of which distill below 464° F. (240° C.) when subjected to distillation in accordance with the Standard Method of Test for Distillation of Gasoline, Naphtha, Kerosene, and Similar Products, ASTM D-86, page 712.

DESCRIPTION OF THE PREFERRED EMBODIMENTS

The following description illustrates the manner in which the principles of the present invention are applied, but it is not to be construed in any way as limiting the scope of the invention.

The present dispersants are beneficially made by a multi-step process. In a first step naphtha, gas oil, or a mixture thereof is cracked at a temperature of from about 810° C. to about 850° C. to obtain the distillate fraction, or still residue, which boils at a temperature above about 200° C., which is liquid at a temperature of 100° Centigrade and which contains a high proportion of polynuclear fused-ring aromatic hydrocarbon compounds. To sulfonate this still residue, it is first dissolved in a non-reactive solvent to form a first solution which is then vigorously mixed with a second solution. The second solution is formed by dissolving sulfur trioxide in a non-reactive solvent. Reaction of the sulfur trioxide with the hydrocarbon compounds is extremely fast. The time needed to achieve complete mixing of the two solutions is usually sufficient to complete reaction of the sulfur trioxide with the hydrocarbon compounds to form an insoluble solid sulfonic acid product. The product may be separated from the remaining liquid by any known method such as filtration. If desired, the product may then be neutralized with a suitable base.

More specifically, fifty (50) grams of the still residue noted above was dissolved in four hundred and fifty (450) grams of methylene chloride. In another vessel, forty (40) grams of liquid sulfur trioxide was dissolved in three hundred sixty (360) grams of methylene chloride. The two solutions were then mixed, through a T connection, in a plug-flow pipe reactor. The flow rate of the still residue solution was maintained at a flow rate twenty (20) times greater than that of the sulfur trioxide solution. The insoluble sulfonated product was continuously removed from the methylene chloride by filtration. The filtrate was recycled to the vessel containing the still residue in order to maintain the flow rates.

When all of the sulfur trioxide solution was used up, the reaction was discontinued and the filtered product was removed from the reactor. The product was first dissolved in water, then neutralized with sodium hydroxide, and finally dried to provide the sodium salt of a mixture of sulfonated polynuclear fused-ring aromatic compounds having a sulfur content of fourteen and two-tenths (14.2) percent by weight.

The mixture of sulfonated compounds produced by the sulfonation of the still residue provides water-soluble dispersants that are highly effective as dispersing agents in aqueous slurries.

The still residues, or mixtures of polynuclear fused-ring compounds prior to sulfonation, suitable for purposes of the present invention have several distinguishing physical characteristics. First, they are liquids at 100° Centigrade. At room temperature (25° Centigrade), the still residues are either solid or liquid depending upon (a) molecular weight distribution and (b) weight average molecular weight thereof. Within a given still residue sample molecular weights from about 150 to about 10,000 may be found. Notwithstanding such a molecular weight distribution, the still residues have a weight average molecular weight of less than about 500. The weight average molecular weight is beneficially from about 200 to about 450, desirably from about 200 to about 400 and, preferably from about 200 to about 350.

The dispersants, or sulfonated polynuclear fused-ring aromatic hydrocarbon compounds, suitably have a sulfur content of from about 10 to about 20 weight percent. Compounds which have a sulfur content of less than about 10 weight percent do not have sufficient hydrophilicity to be commercially viable dispersants. Those skilled in the art will recognize that sulfur contents of greater than 20 weight percent are not readily attainable. The dispersants desirably have a sulfur content of from about 12 to about 15 weight percent.

Carbon-13 nuclear magnetic resonance (nmr) analyses were used to characterize the still residues from which the sulfonated dispersant compounds were made. One characteristic determined by these analyses was the aromatic content of the still residues.

The mixture of sulfonated polynuclear fused-ring aromatic hydrocarbon compounds are preferably used in the form of their sulfonic-acid salts. More preferably, they are used in the form of their sodium salts.

While the concentration level at which these dispersants are used in aqueous slurries may vary widely depending on the required viscosity and/or solids concentration of the slurries, it has been found that for the sodium salts a practical range of the dispersant concentration is between about 0.05 and about 3.0 percent by weight of the particulate solid on a water-free basis. This concentration range has been found to be particularly useful for slurries of coal, lignite, cement, and gypsum.

Specific applications of the dispersants in aqueous slurries are illustrated in the following examples.

EXAMPLES 1-13

A fifty (50) percent by weight lignite-water slurry was prepared by wet grinding the lignite in a rod mill. Dispersants prepared from still residue by the sulfonation process described above were admixed by hand with this slurry and the resulting viscosities for Examples 1-13 were recorded in Table I below. The still residue was liquid at a temperature of 100° C. Viscosity measurements for each example were taken using a Brookfield Viscometer with a moving-pass helical at two and a half revolutions per minute and a cross-bar spindle, No. B. Dispersants neutralized to form their sodium salts were used in this evaluation. The percentage by weight of sulfur in the dispersants, the concentration of dispersants expressed as parts per million (ppm) by weight based on the water-free lignite solids, and the measured viscosities in centipoise (cps) are shown in Table I.

TABLE I

| EXAMPLE NO. | SULFUR CONTENT (% BY WT.) | CONCENTRATION (PPM W/W) | VISCOSITY (CPS) |
|---|---|---|---|
| 1 | — | — | 120,000 |
| 2 | 3 | 2,000 | 110,000 |
| 3 | 3 | 5,000 | 83,000 |
| 4 | 3 | 7,500 | 80,000 |
| 5 | 3 | 10,000 | 72,000 |
| 6 | 6 | 2,000 | 95,000 |
| 7 | 6 | 5,000 | 65,000 |
| 8 | 6 | 7,500 | 52,000 |
| 9 | 6 | 10,000 | 43,000 |
| *10 | 13 | 2,000 | 80,000 |
| *11 | 13 | 5,000 | 35,000 |
| *12 | 13 | 7,500 | 20,000 |
| *13 | 13 | 10,000 | 15,000 |

*Representative of the present invention

The data presented in Table I amply illustrates the effect of sulfur content upon suitability of a compound for use as a dispersant. At a concentration of 10,000 parts per million, a dispersant having a sulfur content of 13 weight percent (Example 13) is much more effective in terms of reducing viscosity than dispersants having a sulfur content either of six weight percent (Example 9) or three weight percent (Example 5). Similar results are obtained with other dispersants which are representative of the present invention.

EXAMPLE 14

The sodium salt form of a sulfonated dispersant containing fourteen (14) percent by weight sulfur was made by the above-noted method. The still residue from which the sulfonated dispersant was prepared had a weight average molecular weight of about 250. A portion of the dispersant was then mixed into a fifty (50) percent by weight lignite-water slurry prepared by wet grinding in a rod mill. One (1) percent by weight (10,000 ppm), based on the water-free lignite solids, of the dispersant was hand mixed into the slurry. The viscosity of the slurry without dispersant was sixty-three (63) Fann Viscometer units at one hundred revolutions per minute using Spindle I, Bob B, whereas the viscosity after the addition of the dispersants was 25 Fann units.

The slurry, with added dispersant, was allowed to stand undisturbed for twenty-four (24) hours, at the end of which time there was no evidence of settling or phase separation. When a commercially available dispersant, a naphthalene sulfonate/formaldehyde condensation polymer sold under the tradename "LOMAR D", was used at the same concentration as the present dispersant, significant phase separation was observed after twenty-four (24) hours.

EXAMPLE 15

A portion of the dispersant prepared in Example 14 was mixed into a Portland cement formulation which contained sixty (60) percent by weight cement available as "Lonestar Class H" and forty (40) percent fresh water. The concentration of the dispersant used was 0.5 percent (5,000 ppm) based on the dry weight of cement. The viscosities in Fann units of the mixture, before and after adding the dispersant, measured with the same viscometer and procedure as used in Example 14 at four different spindle speeds in revolutions per minute (rpm), is shown below.

|  | 100 rpm | 200 rpm | 300 rpm | 600 rpm |
|---|---|---|---|---|
| No Dispersant | 48 | 63 | 75 | 118 |
| 5000 ppm Dispersant | 9 | 20 | 33 | 85 |

EXAMPLE 16

Two hundred (200) grams of gypsum (calcium sulfate) were slowly added to two hundred fifty (250) grams of water in a Hamilton Beach mixer and allowed to soak for forty (40) seconds. The mixture was then vigorously agitated for thirty (30) seconds. This mixture was immediately poured into a Johnson Cup and allowed to drain onto a glass plate. The diameter of the resultant patty of the mixture was seven (7) inches. The procedure was repeated with the addition, before mixing, of a portion of the dispersant from Example 14. The dispersant was used in an amount of 0.3 percent by weight of gypsum dry weight. In the repeat test the resultant patty was eight and three-eighths (8 & $\frac{3}{8}$) inches in diameter.

Examples 14, 15 and 16 clearly demonstrate the effectiveness of dispersants which are representative of the present invention. Similar results are attained with other dispersants representative of the present invention.

While certain representative embodiments and details have been shown for the purpose of illustrating this invention, it will be apparent to those skilled in the art that various changes and modifications can be made therein without departing from the spirit and scope of the invention.

What is claimed is:

1. A water-soluble dispersant composition comprising a mixture of sulfonated polynuclear fused-ring aromatic hydrocarbon compounds having a sulfur content of from about 10 to about 20% by weight of the mixture and produced by sulfonating polynuclear fused-ring aromatic hydrocarbon compounds which are liquid at a temperature of about 100° Centigrade, and have a weight average molecular weight of less than 500 and an aromatic content of greater than about 60 percent.

2. The composition of claim 1 wherein the weight average molecular weight is within a range of from about 200 to about 450.

3. The composition of claim 1 wherein the weight average molecular weight is within a range of from about 200 to about 400.

4. The composition of claim 1 wherein the weight average molecular weight is within a range of from about 220 to about 350.

5. A water-soluble dispersant composition comprising an alkali metal salt of a mixture of sulfonated polynuclear fused-ring aromatic hydrocarbon compounds having a sulfur content of from about 10 to about 20% by weight of the mixture and produced by sulfonating and neutralizing polynuclear fused-ring aromatic hydrocarbon compounds which are liquid at a temperature of about 100° Centigrade and have a weight average molecular weight of less than 500 and an aromatic content of greater than about 60 percent.

6. The composition of claim 5 wherein the alkali metal is sodium.

7. The composition of claim 5 wherein the weight average molecular weight is within a range of from about 200 to about 450.

8. The composition of claim 5 wherein the weight average molecular weight is within a range of from about 200 to about 400.

9. The composition of claim 5 wherein the weight average molecular weight is within a range of from about 220 to about 350.

* * * * *